Patented July 11, 1950

2,515,132

UNITED STATES PATENT OFFICE 2,515,132

INTERPOLYMERS OF DIALLYL ESTERS OF DIETHYL ETHER-DICARBOXYLIC ACIDS

Charles R. Milone, Cuyahoga Falls, Ohio, assignor to Wingfoot Corporation, Akron, Ohio, a corporation of Delaware No Drawing. Application May 3, 1944,
Serial No. 533,924

2 Claims. (Cl. 260—78.3)

This invention relates to resin compositions of improved characteristics and, more particularly, to polymers of allyl and substituted allyl diesters of certain dicarboxylic acids characterized by the presence of an ether group or groups in the molecule.

Resins of certain types are made from numerous classes of unsaturated compounds, the monomeric material being polymerized, under suitable conditions, to yield masses which may be hard and glassy or flexible and rubbery. In the course of investigations looking to the preparation of resins having improved properties, it has been found that the allyl and substituted allyl diesters of diethyl ether dicarboxylic acid, and of the corresponding ethylene glycol and diethylene glycol diethyl ether dicarboxylic acids, are suitable for the preparation of clear transparent resins, either by themselves, in admixture with each other, or interpolymerized with other monomeric substances such as vinyl compounds, vinylidene compounds and the like.

The new esters are prepared from allyl alcohol or a 2-substituted allyl alcohol and a diethyl ether dicarboxylic acid containing at least two and not more than four ethylene groups, i. e., from diethyl ether dicarboxylic acid to diethylene glycol diethyl ether dicarboxylic acid, $HOOC-C_2H_4(OC_2H_4)_3-COOH$. The esters are denoted by the general formula

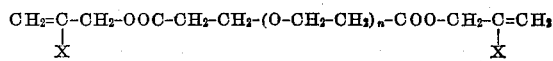

where X is selected from the group consisting of hydrogen, alkyl, and halogen and $n$ is a whole number from 1 to 3 inclusive. It will be observed that the acids may be viewed as diethyl ether dicarboxylic acids in which the carboxyl groups are connected to the adjacent ethyl radicals either directly or through one or two ethylene oxy radicals. Preferably, the diallyl ester of diethyl ether dicarboxylic acid, having the formula

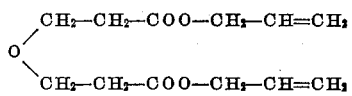

is employed in polymerizations.

The esters may be made by any available method, but are at present prepared by first forming a dinitrile from an acrylonitrile and either ethylene cyanohydrin, ethylene glycol or diethylene glycol. This addition takes place readily in the presence of an alcoholate, such as sodium methylate, or a tertiary amine such as trimethylamine, room temperature ordinarily being sufficient. The dinitrile is then treated with the desired allyl alcohol or 2-substituted allyl alcohol, 2-methallyl, 2-ethallyl, 2-chlorallyl or 2-bromallyl alcohol, in an aqueous acid medium, preferably containing only sufficient water for the reaction, to convert the nitrile radicals to the desired ester groups. Another procedure is to prepare the methyl or ethyl ester from the dinitrile and then convert this to the allyl ester by exchange, or the nitriles may be hydrolyzed to the corresponding acids and the desired esters prepared by esterification. The required acidic medium may be provided by passing hydrogen chloride gas in a mixture of the reactants containing water and continuing to pass in the hydrogen chloride until ammonium chloride ceases to be thrown down. At this time conversion is substantially complete, whereupon the product is filtered and washed with aqueous sodium bicarbonate to remove acid. Subsequent distillation further purifies the ester.

The new esters may be polymerized and copolymerized in any suitable manner. For example, any of these esters may be polymerized in the mass at a temperature between about 60° to 90° C. in the presence or absence of an inert solvent such as dioxane, but preferably with the use of a catalyst, such as benzoyl peroxide, sodium peroxide or other per oxygen compound, the catalyst being present to the extent of 5% or thereabouts on the weight of the monomer. Polymerization may also be induced by the use of ultraviolet light with or without a catalyst, and in the presence or absence of an inert solvent. The temperature employed in any of the polymerization procedures mentioned may depart from those given, the working temperature range varying widely with the type of polymerization, as well as with the size of the specimen. Thus, laminated polymers including, for example, cloth or paper, can be run at a higher temperature than non-laminates. Also, polymerization in solution may be conducted at a higher temperature than mass polymerization. In general, a range from room temperature to 100° C. will be found useful.

Mixtures of two or more of the above described class of esters may be interpolymerized to give comparable results. In addition, these esters may be interpolymerized with other monomers, particularly mono vinyl and mono vinylidene compounds, to give copolymers having valuable properties. Examples of such comonomers are styrene, acrylonitrile, methacrylonitrile, methyl methacrylate, ethyl methacrylate, butyl acrylate, butyl methacrylate, vinyl chloride and vinylidene chloride. The resulting copolymers vary from thermoplastic to thermosetting with increasing amounts of cross-linking material, i. e., the ester, such comonomers to which has been added about 0.1% to 20% by weight of the ester giving resins of improved characteristics. Preferably, a range between 0.1% and 10% of the ester is employed, the cross-linking effect being observable upon the addition of comparatively small quantities of the ester. The comonomer and the ester are polymerized by mass polymerization as set forth above.

The new esters may be added to vinyl chloride-vinylidene chloride mixtures to the extent of 0.1% to 20% by weight of such a mixture and then polymerizing in aqueous emulsion. The aqueous emulsion will contain an emulsifying agent and a catalyst, the emulsifier being, for example, sodium oleate, and the catalyst sodium perborate or benzoyl peroxide. The temperature is ordinarily maintained at from 30° to 80° C., and the emulsion is agitated during the polymerization. The obtained latex may be coagulated by addition of alcohol or by other coagulating agents. Suitable mixtures may contain from 30% to 90% of vinyl chloride and, correspondingly, from 70% to 10% of vinylidene chloride. The addition of the ester influences the resin in the direction of increased resistance to heat and chemical agents, as compared with the resins obtained from the same mixtures without the presence of the esters. Thus, up to 0.1% to 10% or more of one of the above described esters may be added to a mixture of vinylidene chloride, 15 parts, and vinyl chloride, 85 parts, with benefit to the resin obtained upon emulsion polymerization.

While there have been described above certain preferred embodiments of the invention, it will be understood that the invention is not limited thereto, but that numerous modifications may be made therein within the scope of the appended claims, wherein it is intended to cover all features of patentable novelty residing in the invention.

I claim:

1. A composition of matter comprising vinyl chloride and vinylidene chloride interpolymerized with about 0.1% to 20% of the weight of the total chlorides of a diallyl ester of a diethyl ether dicarboxylic acid in which none to both of the carboxyl groups are connected to the adjacent ethyl group by an ethylene oxy radical.

2. A composition of matter comprising a mixture of about 30% to 90% of vinyl chloride and about 70% to 10% of vinylidene chloride interpolymerized with about 0.1% to 20% of the weight of the total chlorides of an ester having the general formula $$CH_2=C-CH_2-OOC-CH_2-CH_2-(O-CH_2-CH_2)_n-COO-CH_2-C=CH_2$$
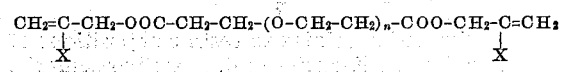

where each X is identically selected from the group consisting of hydrogen, alkyl and halogen, and $n$ is a whole number from one to three.

CHARLES R. MILONE.

REFERENCES CITED

The following references are of record in the file of this patent:

UNITED STATES PATENTS

| Number | Name | Date |
|---|---|---|
| 2,218,439 | Rothrock | Oct. 15, 1940 |
| 2,346,612 | Rothrock | Apr. 11, 1944 |
| 2,347,627 | Bruson | Apr. 25, 1944 |
| 2,379,251 | Muskat et al. | June 26, 1945 |
| 2,386,999 | Adelson et al. | Oct. 16, 1945 |
| 2,433,616 | Marple et al. | Dec. 30, 1947 |
| 2,445,189 | Shokal | July 13, 1948 |